(12) United States Patent
Hapsari et al.

(10) Patent No.: US 8,472,404 B2
(45) Date of Patent: Jun. 25, 2013

(54) MOBILE COMMUNICATION METHOD AND RADIO BASE STATION

(75) Inventors: Wuri Andarmawanti Hapsari, Yokosuka (JP); Mikio Iwamura, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 294 days.

(21) Appl. No.: 12/812,371

(22) PCT Filed: Jan. 8, 2009

(86) PCT No.: PCT/JP2009/050152
§ 371 (c)(1),
(2), (4) Date: Sep. 14, 2010

(87) PCT Pub. No.: WO2009/088044
PCT Pub. Date: Jul. 16, 2009

(65) Prior Publication Data
US 2011/0007708 A1    Jan. 13, 2011

(30) Foreign Application Priority Data
Jan. 11, 2008    (JP) ................ 2008-005063

(51) Int. Cl.
*H04W 4/00*    (2009.01)
(52) U.S. Cl.
USPC ........................................... 370/331
(58) Field of Classification Search
None
See application file for complete search history.

(56) References Cited

U.S. PATENT DOCUMENTS

2006/0019694 A1* 1/2006 Sutivong et al. .............. 455/522
2007/0093268 A1 4/2007 Hosono et al.
2010/0268951 A1* 10/2010 Ryu ............................. 713/169

FOREIGN PATENT DOCUMENTS

| CN | 1953576 A | 4/2007 |
|---|---|---|
| EP | 1 775 983 A1 | 4/2007 |
| JP | 2007-295318 A | 11/2007 |

OTHER PUBLICATIONS

International Search Report w/translation from PCT/JP2009/050152 dated Feb. 10, 2009 (3 pages).
Written Opinion from PCT/JP2009/050152 dated Feb. 10, 2009 (3 pages).
3GPP TS 36.423 V8.0.0; "3rd Generation Partnership Project; Technical Specification Group Radio Access Network; Evolved Universal Terrestrial Radio Access Network (EUTRAN); X2 application protocol (X2AP)"; Dec. 2007 (60 pages).
Office Action for Chinese Patent Application No. 200980102020.7 issued Jul. 24, 2012, with English translation thereof (12 pages).
Office Action in corresponding Canadian Application No. 2,711,864 dated Mar. 4, 2013 (4 pages).
David A. Levine, et al.; "A Resource Estimation and Call Admisiion Algorithm for Wireless Multimedia Networks Using the Shadow Cluster Concept"; IEEE/ACM Transactions on Networking, vol. 5, No. 1; pp. 1-12; Feb. 1997 (12 pages).

* cited by examiner

*Primary Examiner* — John Blanton
(74) *Attorney, Agent, or Firm* — Osha Liang LLP (57) ABSTRACT

A mobile communication method according to the present invention includes the steps of: (A) calculating, at the radio base station (eNB1), an estimated neighbor radio base station parameter, on a basis of load information acquired from a neighbor radio base station (eNB2), the estimated neighbor radio base station parameter being supposed to be used in the neighbor radio base station (eNB2); and (B) notifying, from the radio base station to (eNB1) the neighbor radio base station (eNB2), the estimated neighbor radio base station parameter.

10 Claims, 7 Drawing Sheets

Offset negotiation setup message format

| IE/Group Name | Presence | Range | IE type and reference | Semantics description | Criticality | Assigned Criticality |
|---|---|---|---|---|---|---|
| Message Type | M | | | | | |
| Cell Information | | 1 to maxCell in eNB | | | | |
| >Cell ID | M | | | | | |
| >Evaluated Offset value | O | | | Evaluated offset value for the Cell ID | | |

FIG. 5

Offset negotiation response

| IE/Group Name | Presence | Range | IE type and reference | Semantics description | Criticality | Assigned Criticality |
|---|---|---|---|---|---|---|
| Message Type | M | | | | | |
| Cell Information | | 1 to maxCell in eNB | | | | |
| >Cell ID | M | | | | | |
| >Preferred Offset value | O | | | Preferred offset value for the Cell ID | | |

MOBILE COMMUNICATION METHOD AND RADIO BASE STATION

TECHNICAL FIELD

The present invention relates to a mobile communication method in which a radio base station performs a handover process for a mobile station, and also to a radio base station performing the same.

BACKGROUND ART

In a mobile communication system employing the "LTE (Long Term Evolution)" system specified in the 3GPP, a radio base station eNB1 which is a serving radio base station of mobile stations UE is configured to perform a handover of a mobile station UE to a neighbor radio base station eNB2, when "$P_1$+offset1+hysteresis1<$P_2$+offset2" becomes true for the mobile station.

Here, $P_1$ is a reception power of a signal from the radio base station eNB1 in the mobile station UE, and $P_2$ is a reception power of a signal from the neighbor radio base station eNB2 in the mobile station UE.

In addition, the offset1 and the hysteresis1 are own station parameters which are used in the radio base station eNB1. Each of the offsets and the hysteresis) may be a positive value or a negative value.

Moreover, the offset2 and the hysteresis2 are neighbor base station parameters which are used in the radio base station eNB2. Each of the offset2 and the hysteresis2 may be a positive value or a negative value.

Note that, the offset2 set in the radio base station eNB1 and the offset) set in the radio base station eNB2 are set in accordance with load conditions of an OAM (Operation And Maintenance) apparatus and a neighbor radio base station eNB.

Specifically, the radio base station eNB1 is configured to optimize the aforementioned offset1 and hysteresis1 in accordance with load information (Load Indication) received from the neighbor radio base station eNB2.

However, there is a problem in a conventional mobile communication system. Specifically, in the conventional mobile communication system, a neighbor radio base station parameter ("New offset2") supposed to be used in the neighbor radio base station eNB2 is calculated in the radio base station eNB1, on the basis of the load condition of the neighbor radio base station eNB2, and then, the neighbor radio base station parameter is set and applied to a handover process of a mobile station UE within a serving area under the radio base station eNB1. However, when the neighbor radio base station eNB2 does not know the "new offset2", which is set and applied to the radio base station eNB1, a "Ping Pong phenomenon" likely occurs, i.e., the mobile station UE is handed over to the radio base station eNB1 immediately, because an "old offset2" which is different from the "new offset2" is applied, after the mobile station UE is handed over to the neighbor radio base station eNB2.

Figure 8:
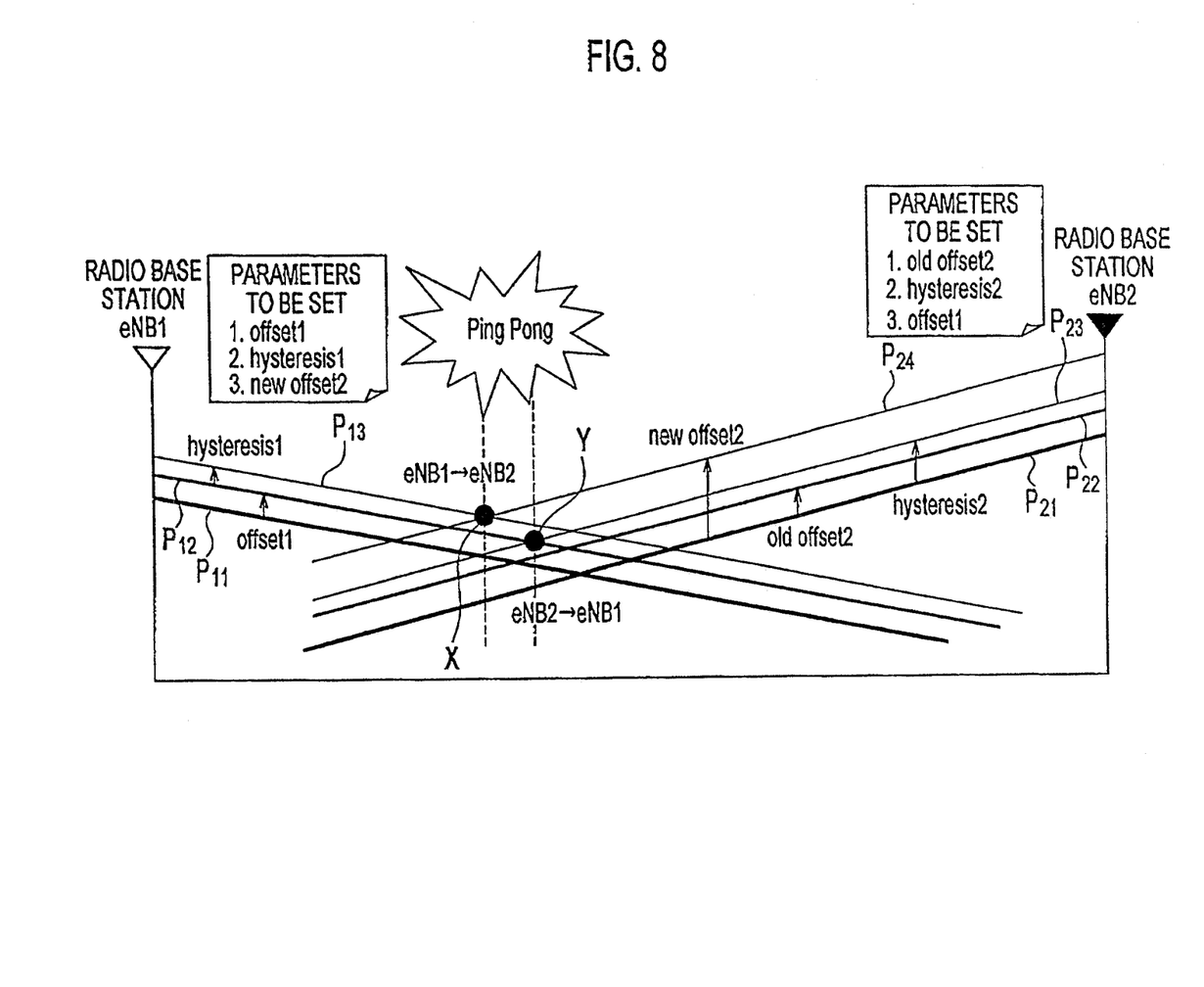
FIG. 8 is a diagram for describing problems in a conventional mobile communication system.

For example, as shown in FIG. 8, when a mobile station UE exists at a point X, there is a problem that the radio base station eNB1 handovers the mobile station UE to the radio base station eNB2, because "$P_{11}$+offset1+hysteresis1 ($P_{13}$)<$P_{21}$+new offset2 ($P_{24}$)" is true, while the radio base station eNB2, handovers the mobile station UE to the radio base station eNB1 because "$P_{21}$+old offset2+hysteresis2 ($P_{23}$)<$P_{11}$+offset1 ($P_{12}$)" is true.

Moreover, when the mobile station UE exists at a point Y, there is a problem that the radio base station eNB2 handovers the mobile station UE to the radio base station eNB1 because "$P_{21}$+old offset2+hysteresis2 ($P_{23}$)<$P_{11}$+offset1 ($P_{12}$)" is true, while the radio base station eNB1 handovers the mobile station UE to the radio base station eNB2, because "$P_{11}$+offset1+hysteresis1 ($P_{13}$)<$P_{21}$+new offset2 ($P_{24}$)" is true.

NON-PATENT DOCUMENT 1: 3GPP TS36.423 V8.0.0

DISCLOSURE OF THE INVENTION

In this respect, the present invention has been made in view of the aforementioned problems. An objective of the present invention is to provide a mobile communication method capable of preventing an occurrence of a "Ping Pong phenomenon" by causing each radio base station to perform a handover process in consideration of a neighbor radio base station parameter used in a neighbor radio base station, and also to provide a radio base station capable of preventing the same.

A first aspect of the present invention is summarized as a mobile communication method in which a radio base station performs a handover process for a mobile station, the method including the steps of: (A) calculating, at the radio base station, an estimated neighbor radio base station parameter, on a basis of load information acquired from a neighbor radio base station, the estimated neighbor radio base station parameter being supposed to be used in the neighbor radio base station; and (B) notifying, from the radio base station to the neighbor radio base station, the estimated neighbor radio base station parameter.

In the first aspect, the mobile communication method can further include the steps of: (C) acquiring, at the radio base station, a neighbor radio base station parameter to be actually used in the neighbor radio base station, as a response made to the notice by the neighbor radio base station; and (D) determining, at the radio base station, whether or not to perform a handover process for the mobile station, on a basis of an own station parameter to be used in the radio base station itself and the neighbor radio base station parameter acquired in the step (C).

In the first aspect, the mobile communication method can further include the steps of: (E) determining a neighbor radio base station parameter to be actually used in the neighbor radio base station, through negotiation between the radio base station and the neighbor radio base station; and (F) determining, at the radio base station, whether or not to perform a handover process for the mobile station, on a basis of an own station parameter to be used in the radio base station itself and the neighbor radio base station parameter acquired in the step (E).

In the first aspect, in the step (B), the radio base station can notify, to the neighbor radio base station, the estimated neighbor radio base station parameter by X2 signaling; and in the step (C), the radio base station can acquire the neighbor radio base station parameter from the neighbor radio base station by X2 signaling.

A second aspect of the present invention is summarized as a radio base station configured to perform a handover process for a mobile station, the radio base station including: an estimation unit configured to calculate an estimated neighbor radio base station parameter, on a basis of load information acquired from a neighbor radio base station, the estimated neighbor radio base station parameter being supposed to be used in the neighbor radio base station; and a negotiation unit configured to notify, to the neighbor radio base station, the estimated neighbor radio base station parameter.

In the second aspect, the negotiation unit can be configured to acquire a neighbor radio base station parameter to be actually used in the neighbor radio base station, as a response made to the notice by the neighbor radio base station; and the radio base station can further include a handover processor unit configured to determine whether or not to perform a handover process for the mobile station, on a basis of an own station parameter to be used in the radio base station itself and the acquired neighbor radio base station parameter.

In the second aspect, the negotiation unit can be configured to determine a neighbor radio base station parameter to be actually used in the neighbor radio base station, by negotiating with the neighbor radio base station; and the radio base station can further include a handover processor unit configured to determine whether or not to perform a handover process for the mobile station, on a basis of an own station parameter to be used in the radio base station itself and the acquired neighbor radio base station parameter.

In the second aspect, the negotiation unit can be configured to notify, to the neighbor radio base station, the estimated neighbor radio base station parameter, and to acquire the neighbor radio base station parameter from the neighbor radio base station, by X2 signaling.

A third aspect of the present invention is summarized as a radio base station configured to perform a handover process for a mobile station, the radio base station including: a negotiation unit configured to reply with a radio base station parameter to a neighbor radio base station, upon receipt of an estimated radio base station parameter from the neighbor radio base station, the radio base station parameter being actually used in the radio base station, the estimated radio base station parameter being supposed to be used in the radio base station; and a handover processor unit configured to determine whether or not to perform a handover process for the mobile station, on a basis of the radio base station parameter and a neighbor base station parameter used in the neighbor radio base station.

A fourth aspect of the present invention is summarized as a radio base station configured to perform a handover process for a mobile station, the radio base station including: a negotiation unit configured to determine a radio base station parameter to be actually used in the radio base station, by negotiating with a neighbor radio base station, when an estimated radio base station parameter supposed to be used in the radio base station is received from the neighbor radio base station; and a handover processor unit configured to determine whether or not to perform a handover process for the mobile station, on a basis of the radio base station parameter and a neighbor radio base station parameter used in the neighbor radio base station.

BEST MODE FOR CARRYING OUT THE INVENTION (Configuration of Mobile Communication System According to First Embodiment of the Present Invention)

A description will be given of a mobile communication system according to a first embodiment of the present invention with reference to FIGS. 1 through 6. In this embodiment, a mobile communication system of the LTE system defined by the 3GPP is used as an example to describe the embodiment. However, the present invention is not limited to the example.

Figure 1:
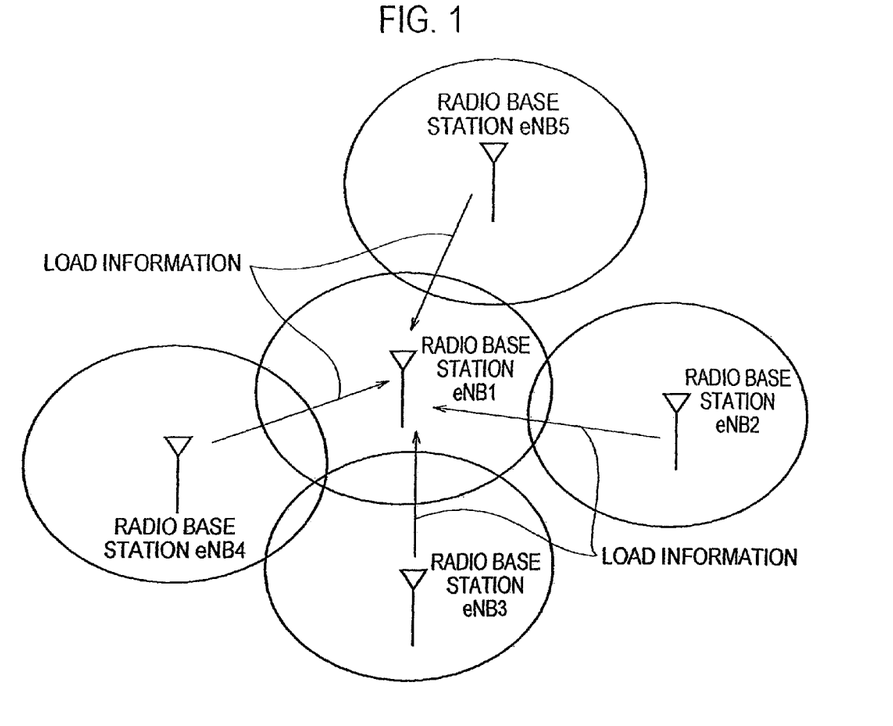
FIG. 1 is an overall configuration diagram of a mobile communication system according to a first embodiment of the present invention.

As shown in FIG. 1, the mobile communication system according to the first embodiment of the present invention includes multiple radio base stations eNB1 to eNB5. Each of the radio base stations eNB1 to eNB5 is configured to transmit a "Load Indication (load information)" defined in the 3GPP TS36.423 to a neighbor radio base station.

The configurations of the radio base stations eNB1 to eNB5 are basically the same. Thus, the configuration of the radio base station eNB1 will be described below as a representative.

Figure 2:
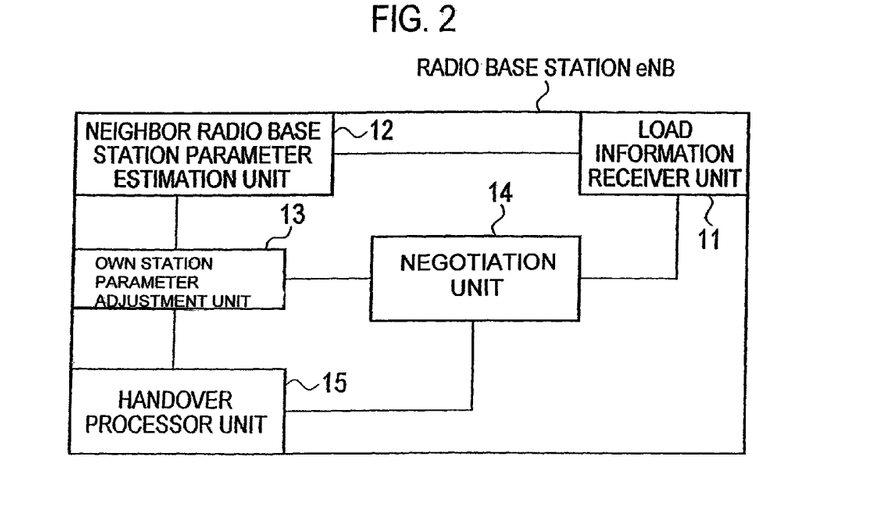
FIG. 2 is a functional block diagram of a radio base station according to the first embodiment of the present invention.

As shown in FIG. 2, the radio base station eNB1 includes a load information receiver unit 11, a neighbor radio base station parameter estimation unit 12, an own station parameter adjustment unit 13, a negotiation unit 14 and a handover processor unit 15.

The load information receiver unit 11 is configured to receive the aforementioned "Load Indication (load information)" from the neighbor radio base stations eNB2 to eNB5.

The neighbor radio base station parameter estimation unit 12 is configured to calculate an estimated neighbor radio base station parameter (an offset2, a hysteresis2 or the like, for example), on the basis of the load information acquired by the load information receiver unit 11, the estimated neighbor radio base station parameter being supposed to be used in a corresponding one of the neighbor radio base stations.

In addition, the neighbor radio base station parameter estimation unit 12 may be configured to calculate an estimated neighbor radio base station parameter (offset2), in consideration of a neighbor radio base station parameter (offset2) that is previously set by an OAM apparatus.

Here, the neighbor radio base station parameter estimation unit 12 may be configured to calculate the estimated neighbor radio base station parameter, when the load information receiver unit 11 acquires the load information. Alternatively, the neighbor radio base station parameter estimation unit 12 may be configured to calculate and estimate the estimated neighbor radio base station parameter in a predetermined cycle.

The own station parameter adjustment unit 13 is configured to adjust an own station parameter (offset1, hysteresis1 or the like, for example), on the basis of the load information acquired by the load information receiver unit 11.

The negotiation unit 14 is configured to notify, to each of the neighbor radio base stations eNB2 to eNB5, the estimated neighbor radio base station parameter, and to acquire a neighbor radio base station parameter to be actually used in the each of the neighbor radio base stations eNB2 to eNB5, as a response made to the notice by the neighbor radio base stations eNB2 to eNB5.

Figure 3:
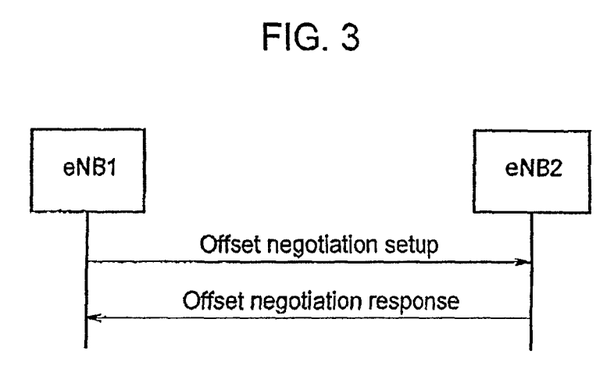
FIG. 3 is a sequence diagram showing how radio base stations negotiate with each other in the mobile communication system according to the first embodiment of the present invention.

For example, the negotiation unit 14 is configured to notify, to each of the neighbor radio base stations eNB2 to eNB5, the estimated neighbor radio base station parameter, by use of an "Offset negotiation setup" message in an X2 signaling procedure as shown in FIG. 3, the parameter being estimated by the neighbor radio base station parameter estimation unit 12.

Further, the negotiation unit 14 is configured to acquire the neighbor radio base station parameter as a response to the "Offset negotiation setup" message, by use of an "Offset negotiation response" message in the X2 signaling procedure, as shown in FIG. 3, the response being made from the each of the neighbor radio base stations eNB2 to eNB5.

Figure 4:
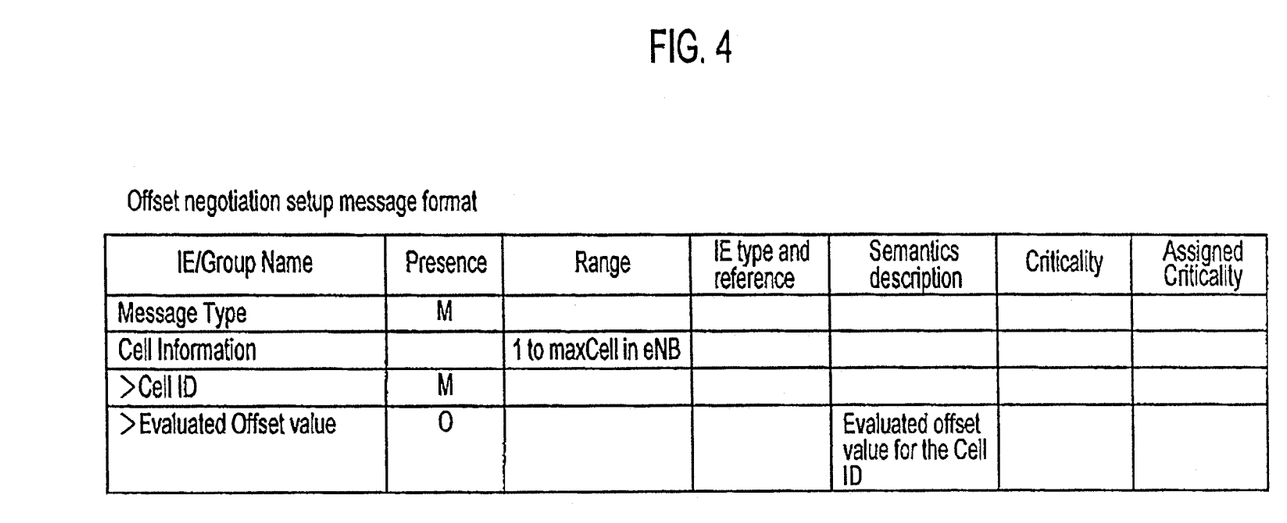
FIG. 4 is a diagram showing a format of an "Offset negotiation setup" message to be transmitted by a radio base station in the mobile communication system according to the first embodiment of the present invention.
Figure 5:
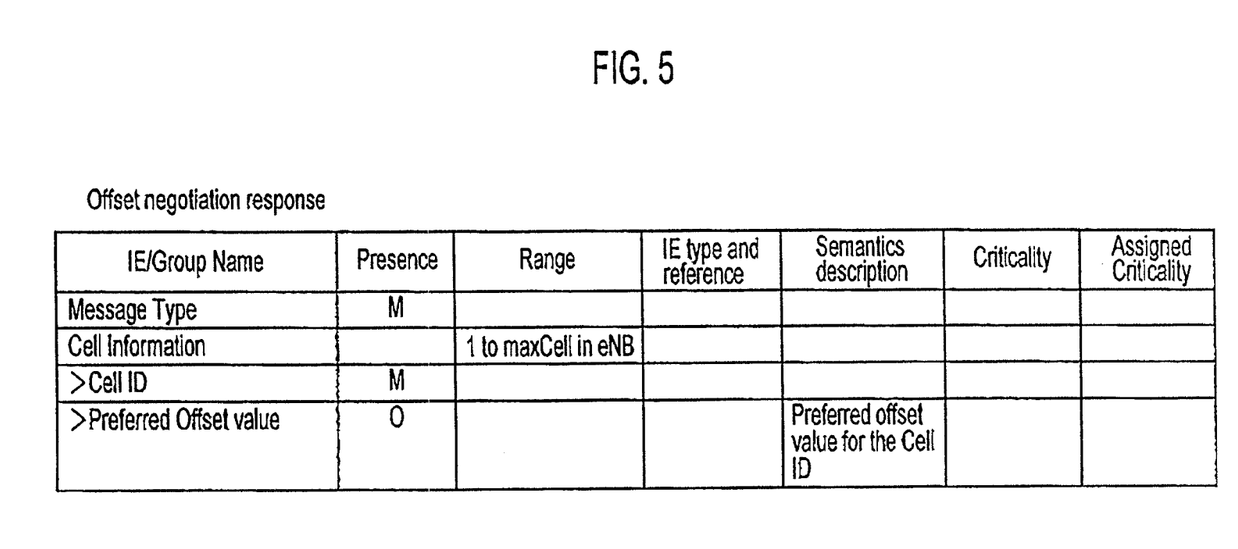
FIG. 5 is a diagram showing a format of an "Offset negotiation response" message to be transmitted by a radio base station in the mobile communication system according to the first embodiment of the present invention.

Here, an example of a format of the "Offset negotiation setup" message is shown FIG. 4, and an example of a format of the "Offset negotiation response" message is shown in FIG. 5.

In FIG. 4, "Evaluated Offset value" specifies the aforementioned estimated neighbor radio base station parameter estimated by the neighbor radio base station parameter estimation unit 12.

In addition, in FIG. 5, "Preferred Offset value for the Cell ID" specifies the neighbor radio base station parameter to be actually used in each of the neighbor radio base stations eNB2 to eNB5.

For example, when the corresponding one of the neighbor radio base stations eNB2 to eNB5 uses the estimated neighbor radio base station parameter specified by "Evaluated Offset value", "Preferred Offset value for the Cell ID" does not have to be set in the "Offset negotiation response" message. Moreover, when notified by one of the neighbor radio base stations eNB2 to eNB5 of the estimated neighbor radio base station parameter (offset1) supposed to be used in the radio base station eNB1, the negotiation unit 14 replies to the one of the neighbor radio base stations eNB2 to eNB5 with a radio base station parameter (offset1) to be actually used in the radio base station eNB1, as the response to the notice.

For example, when receiving an "Offset negotiation setup" message from one of the neighbor radio base stations eNB2 to eNB5, the negotiation unit 14 determines whether or not to use the estimated neighbor radio base station parameter specified by "Evaluated Offset value".

When determining to use the estimated neighbor radio base station parameter, the negotiation unit 14 replies to the one of the neighbor radio base stations eNB2 to eNB5 with an "Offset negotiation response" message indicating that the estimated neighbor radio base station parameter is to be used, i.e., an "Offset negotiation response" message in which "Preferred Offset value for the Cell ID" is not set, or an "Offset negotiation response" message in which the estimated neighbor radio base station parameter is set in "Preferred Offset value for the Cell ID."

On the other hand, when determining not to use the estimated neighbor radio base station parameter, the negotiation unit 14 replies to the one of the neighbor radio base stations eNB2 to eNB5 with an "Offset negotiation response" message in which the radio base station parameter to be actually used is set.

Note that, the negotiation unit 14 may be configured to negotiate with each of the neighbor radio base stations eNB2 to eNB5, e.g., to repeat the operation shown in FIG. 3, and thereby to determine the neighbor radio base station parameter to be actually used in a corresponding one of the neighbor radio base stations eNB2 to eNB5.

For example, consider a case where multiple radio base stations are connected to each other in a "Master-Slave" configuration. In this case, the radio base station eNB1 of "Master" type is configured to notify, to each of the neighbor radio base stations eNB2 to eNB5 of "Slave" type, an estimated neighbor radio base station parameter. Moreover, in this case, the radio base station eNB1 of "Master" type is configured to then acquire the neighbor radio base station parameter to be actually used in the each of the neighbor radio base stations eNB2 to eNB5, as the response made to the notice by the each of the neighbor radio base stations eNB2 to eNB5.

Here, as a general rule, the neighbor radio base station parameter is preferably the same as the estimated neighbor radio base station parameter.

Further, consider another case where multiple radio base stations are connected to each other in a "Master-Slave" configuration. In this case, when the radio base station eNB1 of "Slave" type is notified by one of the neighbor radio base stations eNB2 to eNB5 of "Master" type of an estimated neighbor radio base station parameter (offset1) supposed to be used in the radio base station eNB1, the radio base station eNB1 of "Slave" type replies to the one of the neighbor radio base stations eNB2 to eNB5 with the radio base station parameter (offset1) to be actually used in the radio base station eNB1, as the response to the notice.

Here, if the estimated radio base station parameter (offset1) is usable, the radio base station eNB1 of "Slave" type replies to the one of the neighbor radio base stations eNB2 to eNB5 with the estimated radio base station parameter (offset1) as the radio base station parameter (offset1).

Further, consider a case where multiple radio base stations are connected to each other in a "Distributed" configuration. In this case, each of the radio base stations eNB may be configured to negotiate with the neighbor radio base stations eNB2 to eNB5, e.g., to repeat the operation shown in FIG. 3, and thereby to determine the neighbor radio base station parameter to be actually used in a corresponding one of the neighbor radio base stations eNB2 to eNB5.

The handover processor unit 15 is configured to determine whether or not to perform a handover process for a mobile station UE, on the basis of the own station parameters (offset1 and hysteresis1) adjusted by the own station parameter adjustment unit 13 and the neighbor radio base station parameter (new offset2) acquired by the negotiation unit 14.

Figure 6:
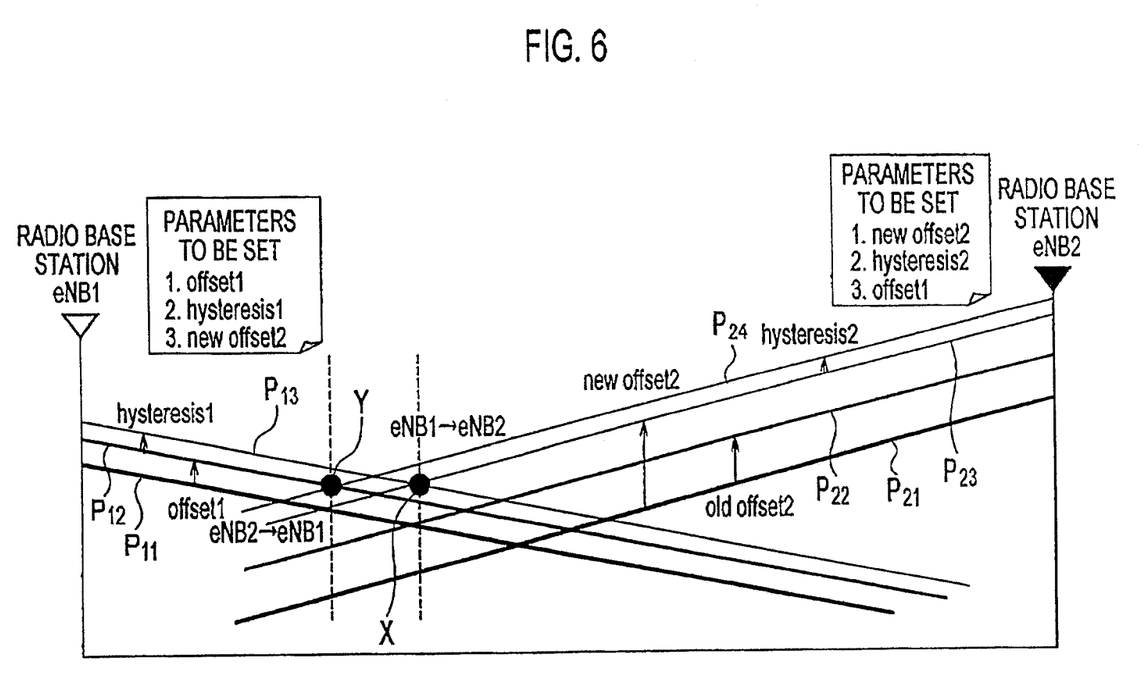
FIG. 6 is a diagram for describing a handover process in the mobile communication system according to the first embodiment of the present invention.

Specifically, as shown in FIG. 6, the handover processor unit 15 is configured to handover a specific mobile station UE to the neighbor radio base station eNB2, when "$P_{11}$+offset1+hysteresis1 ($P_{13}$)<$P_{21}$+new offset2+($P_{23}$)" is true for the specific mobile station UE.

Accordingly, as shown in FIG. 6, when a mobile station UE exists at the point X, the radio base station eNB1 handovers the mobile station UE to the radio base station eNB2, because "$P_{11}$+offset1+hysteresis1 ($P_{13}$)<$P_{21}$+new offset2 ($P_{23}$)" is true. In this case, however, the situation where the radio base station eNB2 handovers the mobile station UE to the radio base station eNB1 does not occur, because "$P_{21}$+new offset2+hysteresis2 ($P_{24}$)<$P_{11}$+offset1 ($P_{12}$)" is not true.

Here, when "$P_{11}$+offset1+hysteresis1 ($P_{13}$)<$P_{21}$+new offset2 ($P_{23}$)" is true, and when the mobile station UE exists at the point X, the mobile station UE may transmit a "Measurement Report" indicating to that effect, to the radio base station eNB1. Then, the radio base station eNB1 may determine that "$P_{11}$+offset1+hysteresis1 ($P_{13}$)<$P_{21}$+new offset2 ($P_{23}$)" is true, on the basis of the Measurement Report.

In addition, when a mobile station UE exists at the point Y, the radio base station eNB2 handovers the mobile station UE to the radio base station eNB1, because "$P_{21}$+new offset2+ hysteresis2 ($P_{24}$)<$P_{11}$+offset1 ($P_{12}$)" is true. In this case, however, the situation where the radio base station eNB1 handovers the mobile station UE to the radio base station eNB2 does not occur, because "$P_{11}$+offset1+hysteresis1 ($P_{13}$)≦$P_{21}$+new offset2 ($P_{23}$)" is not true.

Here, when "$P_{21}$+new offset2+hysteresis2 ($P_{24}$)<$P_{11}$+offset1 ($P_{12}$)" is true, and when the mobile station UE exists at the point Y, the mobile station UE may transmit a "Measurement Report" indicating to that effect, to the radio base station eNB2. Then, the radio base station eNB2 may determine that "$P_{21}$+new offset2+hysteresis2 ($P_{24}$)<$P_{11}$+offset1 ($P_{12}$)" is true, on the basis of the Measurement Report.

Here, consider a case where the amount of traffic is large in the cell under the radio base station eNB1, or the load on the radio base station eNB1 is high, whereas the amount of traffic is small in the cell under the radio base station eNB2, or the load on the radio base station eNB2 is low. In this case, by adjusting the value of the "offset1" or "offset2", the situation can be adjusted so as to make it easy to perform a handover of the mobile station UE from the radio base station eNB1 to the radio base station eNB2 and to make it difficult to perform a handover from the radio base station eNB2 to the radio base station eNB1.

(Operation of Mobile Communication System According to First Embodiment of the Present Invention)

A description will be given of an operation of the mobile communication system according to the first embodiment of the present invention with reference to FIG. 7.

Figure 7:
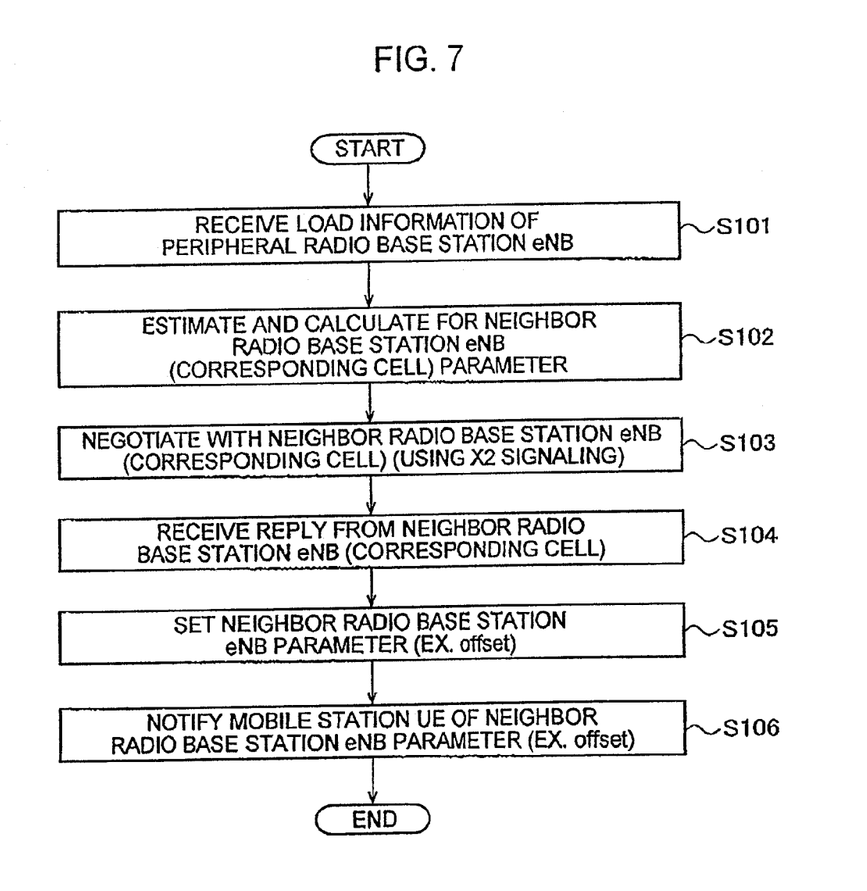
FIG. 7 is a flowchart showing an operation of the mobile communication system according to the first embodiment of the present invention.

As shown in FIG. 7, the radio base station eNB1 acquires load information from each of the neighbor radio base stations eNB2 to eNB5 in step S101.

In step S102, the radio base station eNB1 calculates an estimated neighbor radio base station parameter (offset2 or the like, for example) supposed to be used in a corresponding one of the neighbor radio base stations eNB2 to eNB5.

In step S103, the radio base station eNB1 notifies, to the each of the neighbor radio base stations eNB2 to eNB5, the estimated neighbor radio base station parameter by use of an "Offset negotiation setup" message.

In step S104, the radio base station eNB1 acquires the neighbor radio base station parameter (offset2 or the like, for example) to be actually used in the each of the neighbor radio base stations eNB2 to eNB5, from the each of the neighbor radio base stations eNB2 to eNB5 via an "Offset negotiation response" message.

In step S105, the radio base station eNB1 sets and applies the neighbor radio base station parameters to a mobile station UE existing in the serving area under the radio base station eNB1. Then, the radio base station eNB1 notifies, to the mobile station UE, the neighbor radio base station parameters, in step S106.

Thereafter, the radio base station eNB1 performs a handover process for each mobile station UE by use of the neighbor radio base station parameters acquired from the neighbor radio base stations eNB2 to eNB5 and the own station parameter.

(Operations and Effects of Mobile Communication System According to First Embodiment of the Present Invention)

With the mobile communication system according to the present embodiment, the radio base station eNB1 acquires a neighbor radio base station parameter to be actually used in the radio base station eNB2, by use of the X2 signaling, and the radio base station eNB1 can perform a handover process in consideration of the neighbor radio base station parameter. Thus, the occurrence of "Ping Pong phenomenon" can be prevented.

Note that operation of the above described mobile station UE and of the radio base station eNB may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE and the radio base station eNB. Also, the storage medium and the processor may be provided in the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

INDUSTRIAL APPLICABILITY

As described above, according to the present invention, it is possible to provide a mobile communication method capable of preventing an occurrence of "Ping Pong phenomenon" by causing each radio base station to perform a handover process in consideration of a neighbor radio base station parameter used in a neighbor radio base station, and also to provide a radio base station capable of preventing the same in the same manner.

The invention claimed is:

1. A mobile communication method in which a radio base station performs a handover process for a mobile station, the method comprising the steps of:
   (A) calculating, at the radio base station, an estimated neighbor radio base station parameter, on a basis of load information acquired from a neighbor radio base station, the estimated neighbor radio base station parameter being supposed to be used in the neighbor radio base station; and
   (B) notifying, from the radio base station to the neighbor radio base station, the estimated neighbor radio base station parameter.

2. The mobile communication method according to claim 1, further comprising the steps of:
   (C) acquiring, at the radio base station, a neighbor radio base station parameter to be actually used in the neighbor radio base station, as a response made to the notice by the neighbor radio base station; and
   (D) determining, at the radio base station, whether or not to perform a handover process for the mobile station, on a basis of an own station parameter to be used in the radio base station itself and the neighbor radio base station parameter acquired in the step (C).

3. The mobile communication method according to claim 1, further comprising the steps of:
   (E) determining a neighbor radio base station parameter to be actually used in the neighbor radio base station, through negotiation between the radio base station and the neighbor radio base station; and (F) determining, at the radio base station, whether or not to perform a handover process for the mobile station, on a basis of an own station parameter to be used in the radio base station itself and the neighbor radio base station parameter acquired in the step (E).

4. The mobile communication method according to claim 2, wherein in the step (B), the radio base station notifies, to the neighbor radio base station, the estimated neighbor radio base station parameter by X2 signaling; and in the step (C), the radio base station acquires the neighbor radio base station parameter from the neighbor radio base station by X2 signaling.

5. A radio base station configured to perform a handover process for a mobile station, the radio base station comprising:

an estimation device configured to calculate an estimated neighbor radio base station parameter, on a basis of load information acquired from a neighbor radio base station, the estimated neighbor radio base station parameter being supposed to be used in the neighbor radio base station; and a negotiation device configured to notify, to the neighbor radio base station, the estimated neighbor radio base station parameter.

6. The radio base station according to claim 5, wherein the negotiation device is configured to acquire a neighbor radio base station parameter to be actually used in the neighbor radio base station, as a response made to the notice by the neighbor radio base station; and wherein the radio base station further comprises:

a handover processor configured to determine whether or not to perform a handover process for the mobile station, on a basis of an own station parameter to be used in the radio base station itself and the acquired neighbor radio base station parameter.

7. The radio base station according to claim 5, wherein the negotiation device is configured to determine a neighbor radio base station parameter to be actually used in the neighbor radio base station, by negotiating with the neighbor radio base station; and wherein the radio base station further comprises:

a handover processor configured to determine whether or not to perform a handover process for the mobile station, on a basis of an own station parameter to be used in the radio base station itself and the acquired neighbor radio base station parameter.

8. The radio base station according to claim 6, wherein the negotiation device is configured to notify, to the neighbor radio base station, the estimated neighbor radio base station parameter, and to acquire the neighbor radio base station parameter from the neighbor radio base station, by X2 signaling.

9. A radio base station configured to perform a handover process for a mobile station, the radio base station comprising:

a negotiation device configured to reply with a radio base station parameter to a neighbor radio base station, upon receipt of an estimated radio base station parameter from the neighbor radio base station, the radio base station parameter being actually used in the radio base station, the estimated radio base station parameter being supposed to be used in the radio base station; and a handover processor configured to determine whether or not to perform a handover process for the mobile station, on a basis of the radio base station parameter and a neighbor base station parameter used in the neighbor radio base station.

10. A radio base station configured to perform a handover process for a mobile station, the radio base station comprising:

a negotiation device configured to determine a radio base station parameter to be actually used in the radio base station, by negotiating with a neighbor radio base station, when an estimated radio base station parameter supposed to be used in the radio base station is received from the neighbor radio base station; and a handover processor configured to determine whether or not to perform a handover process for the mobile station, on a basis of the radio base station parameter and a neighbor radio base station parameter used in the neighbor radio base station.

* * * * *